United States Patent
Ettridge et al.

(10) Patent No.: US 10,826,294 B2
(45) Date of Patent: Nov. 3, 2020

(54) MULTI-SOURCE POWER DISTRIBUTION SYSTEM

(71) Applicant: GE Aviation Systems Limited, Cheltenham, Gloucestershire (GB)

(72) Inventors: David Graham Ettridge, Bishops Cleeve (GB); Thomas David Oliver Pocock, Bristol (GB); Keval Mehta, Cheltenham Spa (GB)

(73) Assignee: GE Aviation Systems Limited, Cheltenham, Gloucestershire (GB)

( * ) Notice: Subject to any disclaimer, the term of this patent is extended or adjusted under 35 U.S.C. 154(b) by 156 days.

(21) Appl. No.: 16/072,472

(22) PCT Filed: Feb. 22, 2017

(86) PCT No.: PCT/EP2017/054089
§ 371 (c)(1),
(2) Date: Jul. 24, 2018

(87) PCT Pub. No.: WO2017/148774
PCT Pub. Date: Sep. 8, 2017

(65) Prior Publication Data
US 2019/0036338 A1    Jan. 31, 2019

(30) Foreign Application Priority Data
Feb. 29, 2016    (GB) .................................. 1603448.0

(51) Int. Cl.
*H02J 3/38*    (2006.01)
*H02J 4/00*    (2006.01)

(52) U.S. Cl.
CPC . *H02J 3/38* (2013.01); *H02J 4/00* (2013.01)

(58) Field of Classification Search
USPC .......................................... 307/26, 9.1, 10.1
See application file for complete search history.

(56) References Cited

U.S. PATENT DOCUMENTS

| | | | |
|---|---|---|---|
| 5,466,974 A | 11/1995 | Sutrina et al. | |
| 5,729,059 A * | 3/1998 | Kilroy | H02J 3/42 307/44 |

(Continued)

FOREIGN PATENT DOCUMENTS

| | | |
|---|---|---|
| EP | 2077226 A2 | 7/2009 |
| GB | 2318934 A | 10/1997 |

OTHER PUBLICATIONS

Great Britain Search Report dated Aug. 30, 2016 which was issued in connection with patent application No. GB 1603448.0 which was filed on Feb. 29, 2016.

(Continued)

*Primary Examiner* — Rexford N Barnie
*Assistant Examiner* — Xuan Ly
(74) *Attorney, Agent, or Firm* — Dority & Manning, P.A.

(57) ABSTRACT

Systems and methods for controlling power distribution are provided. More particularly, in one embodiment, a method can include monitoring a first plurality of electrical characteristics for each power source of a plurality of power sources. The plurality of power sources can include a first generator, a second generator, an auxiliary power source, and an external power source. The method can include monitoring a second plurality of electrical characteristics for each bus of a plurality of buses. The plurality of buses can include a first electrical bus, a second electrical bus, and an electrical tie bus. The method can further include selectively controlling a power distribution of the plurality of power sources among the plurality of buses based, at least in part, on the first and second pluralities of electrical characteristics.

18 Claims, 5 Drawing Sheets

(56) References Cited

U.S. PATENT DOCUMENTS

| | | | | |
|---|---|---|---|---|
| 5,764,502 A | * | 6/1998 | Morgan ................... | H02J 4/00 363/65 |
| 2009/0224599 A1 | | 9/2009 | Yue et al. | |
| 2010/0231042 A1 | | 9/2010 | Weale | |
| 2013/0313901 A1 | | 11/2013 | Good et al. | |

OTHER PUBLICATIONS

International Search Report dated May 31, 2017 which was issued in connection with PCT application No. PCT/EP2017/054089 which was filed on Feb. 22, 2017.

* cited by examiner

MULTI-SOURCE POWER DISTRIBUTION SYSTEM

FIELD OF INVENTION

The present subject matter relates generally to multi-source electrical power systems, and more particularly to distributing power from a multi-source electrical power system.

BACKGROUND OF THE INVENTION

A multi-source electrical power system can include an electrical bus that can receive power from multiple power sources. For instance, contactors or other switching elements can be used to selectively couple each of the multiple power sources to the electrical bus. For instance, in an aviation system, electrical power for avionics, motors, and other electrical equipment on an aircraft can be provided by multiple generator systems coupled to the electrical bus.

It can be desirable in certain circumstances to switch power delivery between power sources coupled to the electrical bus. For instance, it may be desirable to transfer power delivery from one of the multiple power sources to another power source. To do so, the electrical power system can include control logic to dictate the desired transfer of power delivery.

Current designs use auxiliary contactors to determine whether to couple or de-couple a power source to the electrical bus. This approach, however, leads to complex control logic for controlling power delivery. Moreover, auxiliary contactors can be heavy and expensive, while introducing additional failure points into the electrical power system.

BRIEF DESCRIPTION OF THE INVENTION

Aspects and advantages of the present disclosure will be set forth in part in the following description, or may be learned from the description, or may be learned through practice of the examples disclosed herein.

One example aspect of the present disclosure is directed to a method for controlling power distribution. The method can include monitoring, by one or more control devices, a first plurality of electrical characteristics for each power source of a plurality of power sources. The plurality of power sources can include a first generator, a second generator, an auxiliary power source, and an external power source. The method can further include monitoring, by the one or more control devices, a second plurality of electrical characteristics for each bus of a plurality of buses. The plurality of buses can include a first electrical bus, a second electrical bus, and an electrical tie bus. The method can include selectively controlling, by the one or more control devices, a power distribution of the plurality of power sources among the plurality of buses based, at least in part, on the first and second pluralities of electrical characteristics.

Another example aspect of the present disclosure is directed to an electrical power system. The system can include a plurality of power sources, a plurality of buses, and a control system. The control system can be configured to monitor a first plurality of electrical characteristics for each power source of the plurality of power sources, and monitor a second plurality of electrical characteristics for each bus of the plurality of buses. The control system can be further configured to selectively control a power distribution of the plurality of power sources among the plurality of buses based at least in part on the first plurality of electrical characteristics and the second plurality of electrical characteristics.

Yet another example aspect of the present disclosure is directed to a method for controlling power distribution. The method can include monitoring, by one or more control devices, a first voltage and a first frequency associated with a first power source, and a first bus power and a first bus frequency associated with a first electrical bus. The method can further include determining, by the one or more control devices, whether the first voltage associated with the first power source is within a first voltage limit. The method can include determining, by the one or more control devices, whether at least one of the first frequency associated with the first power source is synchronized with the first bus frequency associated with the first electrical bus or the first bus power associated with the first electrical bus is absent. The method can further include coupling, by the one or more control devices, the first power source to the first electrical bus when it is determined that the first voltage associated with the first power source is within the first voltage limit, and that the first frequency associated with the first power source is synchronized with the first bus frequency associated with the first electrical bus or the first bus power is absent.

Other example aspects of the present disclosure are directed to systems, methods, aircrafts, avionics systems, devices, non-transitory computer-readable media for controlling power distribution.

Variations and modifications can be made to these example aspects of the present disclosure.

These and other features, aspects and advantages of various examples will become better understood with reference to the following description and appended claims. The accompanying drawings, which are incorporated in and constitute a part of this specification, illustrate aspects of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments of the present disclosure, one or more example(s) of which are illustrated in the drawings. Each example is provided by way of explanation of the invention, not limitation of the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

Example aspects of the present disclosure are directed to systems and methods for controlling power distribution. For instance, an electrical power system of an aircraft can include a plurality of power sources, a plurality of electrical buses, and a control system. The control system can be configured to monitor a plurality of electrical characteristics (e.g., voltage, frequency, current, power) associated with each of the power sources and/or electrical buses. The control system can include simplified control logic by which it selectively controls the power distribution of the plurality of power sources among the plurality of electrical buses. To do so, the control system can couple each of the power sources to a corresponding electrical bus based, at least in part, on the electrical characteristics. For example, a generator can be coupled to a corresponding electrical bus when, among other things, the generator frequency is synchronized with the bus frequency. As such, the control system can control the power distribution using simplified logic to avoid various electrical failures of multi-source electrical power systems, including crash paralleling of out-of-sync generators and those introduced by auxiliary contactors.

More particularly, the electrical power system can include a plurality of power sources that can deliver power. The plurality of power sources can include various types of power sources. For example, the power sources can include a first generator, a second generator, an auxiliary power source, and an external power source. In some implementations, the first and second generators can be mechanically powered by one or more aircraft engines via one or more gearboxes. The auxiliary power source can be associated with a gas turbine engine. Moreover, the external power source can be associated with, for example, a ground power unit.

Each of the power sources can deliver power via a plurality of electrical buses. The electrical buses can include, for example, a first electrical bus, a second electrical bus, and an electrical tie bus. The first generator can be configured to deliver power to the first electrical bus, while the second generator can be configured to deliver power to the second electrical bus. The auxiliary power source and the external power source can each be configured to deliver power to the electrical tie bus.

The control system of the electrical power system can monitor a plurality of electrical characteristics associated with each of the power sources and/or electrical buses. For instance, the control system can monitor the current associated with each of the power sources via a plurality of measurement devices (e.g., current transformer assemblies). The control system can also be configured to monitor a power, a voltage, and/or a frequency for each power source. The control system can also be configured to monitor a power, a voltage, and/or a frequency for each electrical bus.

The control system can be configured to determine the state of the electrical characteristics associated with each power source and/or electrical bus. For example, the control system can be configured to determine whether the voltage and/or frequency associated with a first power source are within one or more voltage limit(s) and/or frequency limit(s). In another example, the control system can determine whether the current and power associated with a power source and/or electrical bus is present or absent, as further described herein. In yet another example, the control system can determine whether a frequency associated with a power source is synchronized with a frequency associated with an electrical bus. This can help avoid coupling out-of-sync generators to an electrical bus.

The control system can also determine whether one or more error conditions (e.g., bit failure, under voltage, over voltage, lack of signal from transformer, internal ambiguity) exist within the electrical power system. This can influence the selected power distribution. For example, the existence of an error condition can cause the control system to avoid coupling and/or de-couple a power source to an electrical bus.

The control system can be configured to selectively control a power distribution of the plurality of power sources among the plurality of electrical buses based, at least in part, on the electrical characteristics. For instance, the control system can couple and/or de-couple the power sources to the electrical buses when certain conditions (e.g., related to the electrical characteristics) are met via one or more contactors.

For example, the control system can couple the first generator to the first electrical bus based, at least in part, on the state of certain electrical characteristics. The control system can monitor a first voltage and a first frequency associated with the first generator, and a first bus power and a first bus frequency associated with the first electrical bus. When certain voltage, frequency, and power conditions (e.g., voltage limits, frequency synchronization, power levels) are met the control system can couple the first generator to the first electrical bus, as further described herein. To do so, the control system can send one or more control signal(s) to close a corresponding non-auxiliary contactor. However, if an error condition is detected, the control system can avoid coupling the first generator to the electrical bus by keeping the contactor in an open position.

In another example, the control system can de-couple the first and/or second electrical bus from the electrical tie bus to prevent cross-linking of generators. The control system can monitor the current associated with each of the power sources and a power associated with each of the electrical buses. When certain current and power conditions (e.g., current presence, current levels, power presence, power levels) are met, the control system can de-couple the first and/or second electrical bus from the electrical tie bus (e.g., via a non-auxiliary cross-tie contactor) to prevent the cross-linking of the first and/or second generators to the electrical tie bus.

The systems and methods according to example aspects of the present disclosure can more effectively distribute power amongst the electrical buses of an electrical power system. More particularly, based on the state of certain electrical characteristics, the systems and methods can selectively couple and/or de-couple power sources from one or more electrical buses based on simplified control logic. In this way, the systems and methods according to example aspects of the present disclosure have a technical effect of reducing system weight by eliminating the use of auxiliary contactors, preventing crash paralleling of out-of-sync generators, and unnecessarily cross-linking power sources.

Figure 1:
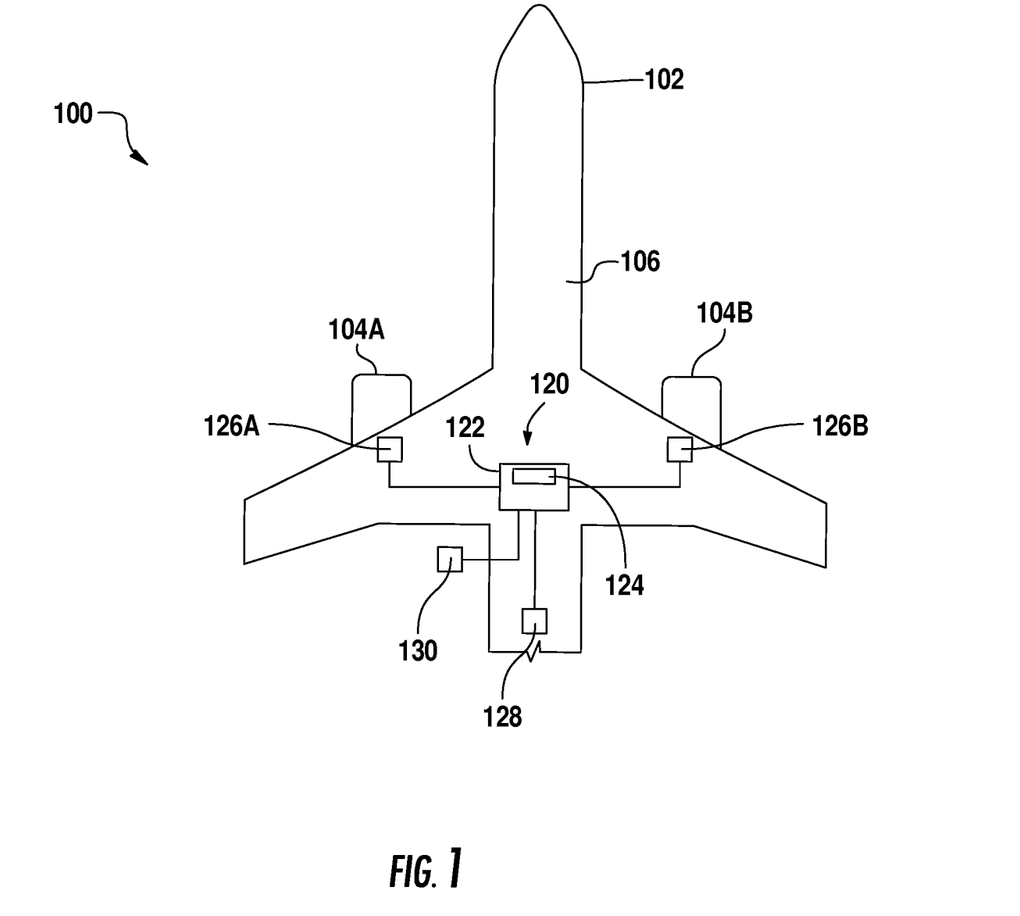
FIG. 1 depicts aspects of an example system according to example embodiments of the present disclosure.

FIG. 1 depicts an example system 100 according to example embodiments of the present disclosure. As shown, the system 100 can include an aircraft 102. The aircraft 102 can include one or more engine(s) 104A-B, a fuselage 106, and an electrical power system 120.

The electrical power system 120 can include a plurality of power sources (e.g., 126A, 126B, 128, and 130), a plurality of electrical buses (not shown), and a control system 122. The plurality of power sources can be configured to deliver power to the aircraft 102 via the plurality of electrical buses. For instance, the plurality of power sources can include one or more generators, auxiliary power sources, external power sources, batteries, fuel cells, etc. In the event the electrical power system 120 includes alternating current, the electrical power system 120 can include one or more inverters and/or other types of suitable rotating devices. Moreover, the control system 122 can be configured to communicate with the plurality of power sources and/or the plurality of electrical buses via a wired and/or wireless network. While the accompanying figures are described above with reference to four power sources, the present disclosure is not so limited. For instance, the systems and methods of the present disclosure can be implemented for any number of power sources.

The plurality of power sources can include various types of power sources. For instance, the plurality of power sources can include a first power source 126A and a second power source 126B. The first power source 126A can include, for example, a first generator. In some implementations, the first generator can be mechanically powered by the engine 104A associated with the aircraft 102 via a gearbox. The second power source 126B can include, for example, a second generator. In some embodiments, the second generator can be mechanically powered by the engine 104B associated with the aircraft 102 via a gearbox.

The plurality of power sources can also include a third power source 128 and a fourth power source 130. The third power source 128 can include, for example, an auxiliary power source associated with the aircraft 102. In some implementations, the auxiliary power source can include a gas turbine engine. The fourth power source 130 can include, for example, an external power source. In some implementations, the external power source can include a ground power unit, such as a vehicle configured to supply power to the aircraft 102 and/or a power unit built into a jetway.

The control system 122 can include one or more control device(s) 124 that can be associated with, for instance, an avionics system. The control device(s) 124 can include one or more controllers, sensors and/or other control devices configured to perform various measurements (e.g., voltage, frequency, current measurements) and to control various aspects of the electrical power system 120.

In some embodiments, the control device(s) 124 can include one or more processors and one or more memory devices. The memory devices can include computer-readable instructions or other control logic that when executed by the one or more processors cause the control system to provide desired control functionality, such as sending one or more control signals or other control functions set forth in the present disclosure. The control logic can be implemented at any suitable location, such as by a separate control device or one or more controllers associated with the electrical power system 120. The control device(s) 124 can be, for example, configured to monitor a plurality of electrical characteristics for each power source and each electrical bus of the electrical power system 120. As further described below, the control device(s) 124 can be configured to selectively control a power distribution of the plurality of power sources among the plurality of electrical buses based, at least in part, on the electrical characteristics of the power sources and/or the electrical buses.

Figure 2:
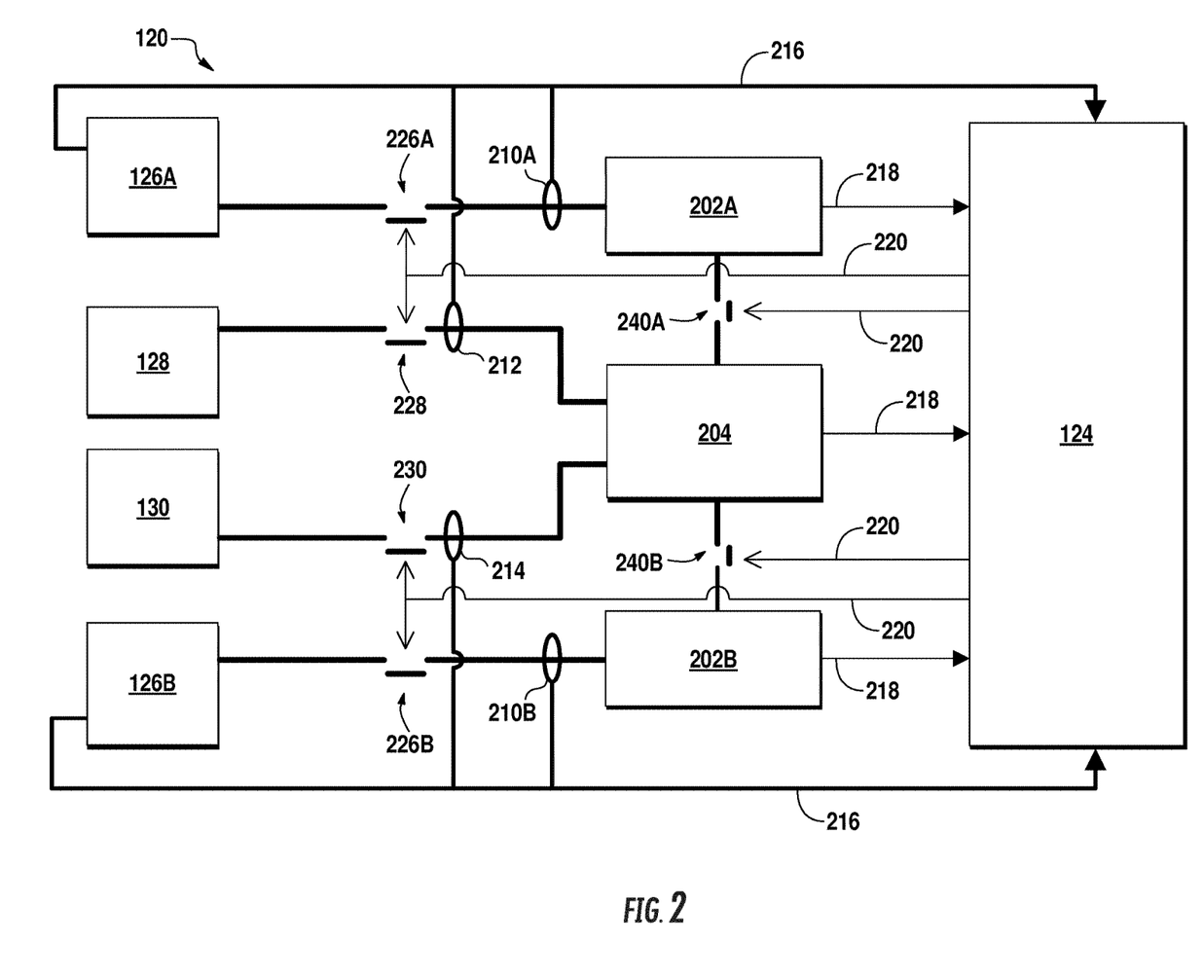
FIG. 2 depicts aspects of an example electrical power system according to example embodiments of the present disclosure.

FIG. 2 depicts aspects of an example electrical power system 120 according to example embodiments of the present disclosure. As shown, the electrical power system 120 can include a plurality of power sources: the first power source 126A (e.g., first generator), the second power source 126B (e.g., second generator), the third power source 128 (e.g., auxiliary power source), and the fourth power source 130 (e.g., external power source). In some implementations, each power source can be associated with its own respective control unit. The electrical power system 120 can also include a first electrical bus 202A, a second electrical bus 202B, and a third electrical bus 204 (e.g., an electrical tie bus).

The control device(s) 124 can be configured to monitor a first plurality of electrical characteristics for each power source of the plurality of power sources 126A, 126B, 128, and 130. For instance, the control device(s) 124 can be configured to monitor the current associated with each of the power sources via one or more measurement device(s) 210A, 210B, 212, and 214 (e.g., current transformer assemblies). The control device(s) 124 can also be configured to monitor a power, a voltage, and/or a frequency for each power source 126A, 126B, 128, and 130. Current, power, voltage, frequency, and/or any other electrical characteristic measurements can be provided to the control device(s) 124 via one or more feedback signal(s) 216 from one or more sensor(s) or other measurement device(s) configured to provide signal(s) indicative of the electrical characteristic measurements associated with the power sources 126A, 126B, 128, and 130.

The control device(s) 124 can be configured to monitor a second plurality of electrical characteristics for each electrical bus of the plurality of electrical buses 202A, 202B, and 204. For example, the control device(s) 124 can be configured to monitor a power, a voltage, and/or a frequency for each electrical bus. Power, voltage, frequency, and/or any other electrical characteristic measurements can be provided to the control device(s) 124 via one or more feedback signal(s) 218 from one or more sensor(s) or other measurement device(s) configured to provide signal(s) indicative of the electrical characteristic measurements associated with the electrical buses 202A, 202B, and 204.

The control device(s) 124 can be configured to determine the state of the electrical characteristics associated with the power sources 126A, 126B, 128, and 130 and/or the electrical buses 202A, 202B, and 204. For example, the control device(s) 124 can be configured to determine whether the voltages associated with the first power source 126A, the second power source 126B, the third power source 128, and/or the fourth power source 130 are within one or more voltage limit(s). In some implementations, the voltage limit(s) can be associated with voltage limits as set forth in Mil Spec 704F/DO106 sect. 16. Each voltage limit can be the same, similar, or different from the other voltage limits.

The control device(s) 124 can be configured to determine the state of a frequency associated with a power source and/or an electrical bus. For example, the control devices can be configured to determine whether a frequency associated with each of the first power source 126A, the second power source 126B, the third power source 128, and/or the fourth power source 130 is within one or more frequency limits (e.g., as set forth in Mil Spec 704F/DO106 sect. 16). Each frequency limit can be the same, similar, or different from the other frequency limits.

Additionally, and/or alternatively, the control device(s) 124 can be configured to determine whether a frequency associated with each power source is synchronized with a frequency associated with an electrical bus. For example, the control device(s) 124 can be configured to determine whether the frequency associated with the first power source 126A is synchronized with a frequency associated with the first electrical bus 202A. The control device(s) 124 can also be configured to determine whether the frequency associated with the second power source 126B is synchronized with a frequency associated with the second electrical bus 202B. The control device(s) 124 can be further configured to determine whether the frequency associated with the third power source 128 and/or the frequency associated with the fourth power source 130 is synchronized with a frequency associated with the third electrical bus 204. In this way, the control device(s) 124 can avoid crash paralleling of out-of-sync power sources when coupled to the electrical power system 120.

The control device(s) 124 can also be configured to determine whether the power associated with each of the power sources 126A, 126B, 128, and 130 and/or electrical buses 202A, 202B, and 204 is present or absent. For example, the control device(s) 124 can be configured to determine that power is present when the associated component is powered, the power is non-zero, and/or the power is above a certain threshold. The control device(s) 124 can be configured to determine that power is absent when the associated component is powered, the power is zero, and/or the power is below a certain threshold.

The control device(s) 124 can be configured to determine whether the current associated with each of the power sources 126A, 126B, 128, and 130 is present or absent. For example, control device(s) 124 can be configured to determine that current is present when there is current flow associated with the power source and/or the current is above a certain threshold. The control device(s) 124 can be configured to determine that current is absent when there is no current flow associated with the power source and/or the current is below a certain threshold.

The control device(s) 124 can be configured to detect one or more error conditions associated with the electrical power system 120. For example, the control device(s) 124 can be configured to determine that one or more error conditions (e.g., bit failure, under voltage, over voltage, lack of signal from current transformer/current sensing device, internal ambiguity) exist within the electrical power system 120.

The control device(s) 124 can be configured to selectively control a power distribution of the plurality of power sources 126A, 126B, 128, and 130 among the plurality of electrical buses 202A, 202B, and 204 based, at least in part, on the first plurality of electrical characteristics and the second plurality of electrical characteristics. For example, the control device(s) 124 can be configured to selectively control the power distribution of the plurality of power sources 126A, 126B, 128, and 130 among the plurality of electrical buses 202A, 202B, and 204 by selectively coupling and de-coupling a plurality of contactors 226A, 226B, 228, and 230 associated with the plurality of electrical buses. The contactors described herein can include, for instance, various types of switching devices, solid state power controllers, (FET devices), and/or any other suitable device user to allow and/or prevent the passage of current. Additionally, and/or alternatively, the contactors 226A, 226B, 228, and 230 can be non-auxiliary contactors. The control device(s) 124 can be configured to send one or more control signal(s) 220 to adjust the position (e.g., open, close) of each of the contactors 226A, 226B, 228, and 230. The determination of which contactors 226A, 226B, 228, and 230 to couple and/or de-couple can be based, at least in part, on the voltages, frequencies, currents, powers, other electrical characteristic measurements, and/or the existence of one or more error conditions.

The control device(s) 124 can be configured to control the power distribution to prevent crash paralleling of out-of-sync generators and cross-linking of power sources. For example, the control device(s) 124 can be configured to selectively control the power distribution such that the first power source 126A (e.g., first generator) has priority over the first electrical bus 202A, the second power source 126B (e.g., second generator) has priority over the second electrical bus 202B, and the third power source 128 (e.g., auxiliary power source) has priority over the third electrical bus 204. The control device(s) 124 can be configured to selectively control the power distribution to prevent cross-linking of the first power source 126A and the second power source 126B to the third electrical bus 204 by, for example, controlling one or more cross-tie contactors 240A-B via the one or more control signal(s) 220, as further described below.

Example implementations of the present disclosure are discussed with reference to the example electrical power system 120 for use with an aircraft for purposes of illustration and discussion. Those of ordinary skill in the art, using the disclosures provided herein, shall understand that the present subject matter can be used with any suitable multi-source power system without deviating from the scope of the present disclosure. For example, the electrical power system may or may not be associated with the aircraft 102 or other airborne power system. Moreover, the systems and methods of the present disclosure can be implemented in any vehicle (e.g., ships, automobiles) that involve multiple power sources and/or multiple electrical buses. In some embodiments, the electrical power system can include any combination of DC power sources and AC power sources. In some embodiments, at least one of the power systems (e.g., only one of the power sources) can be associated with a power converter. The electrical buses can be DC electrical buses or AC electrical buses.

Figure 3:
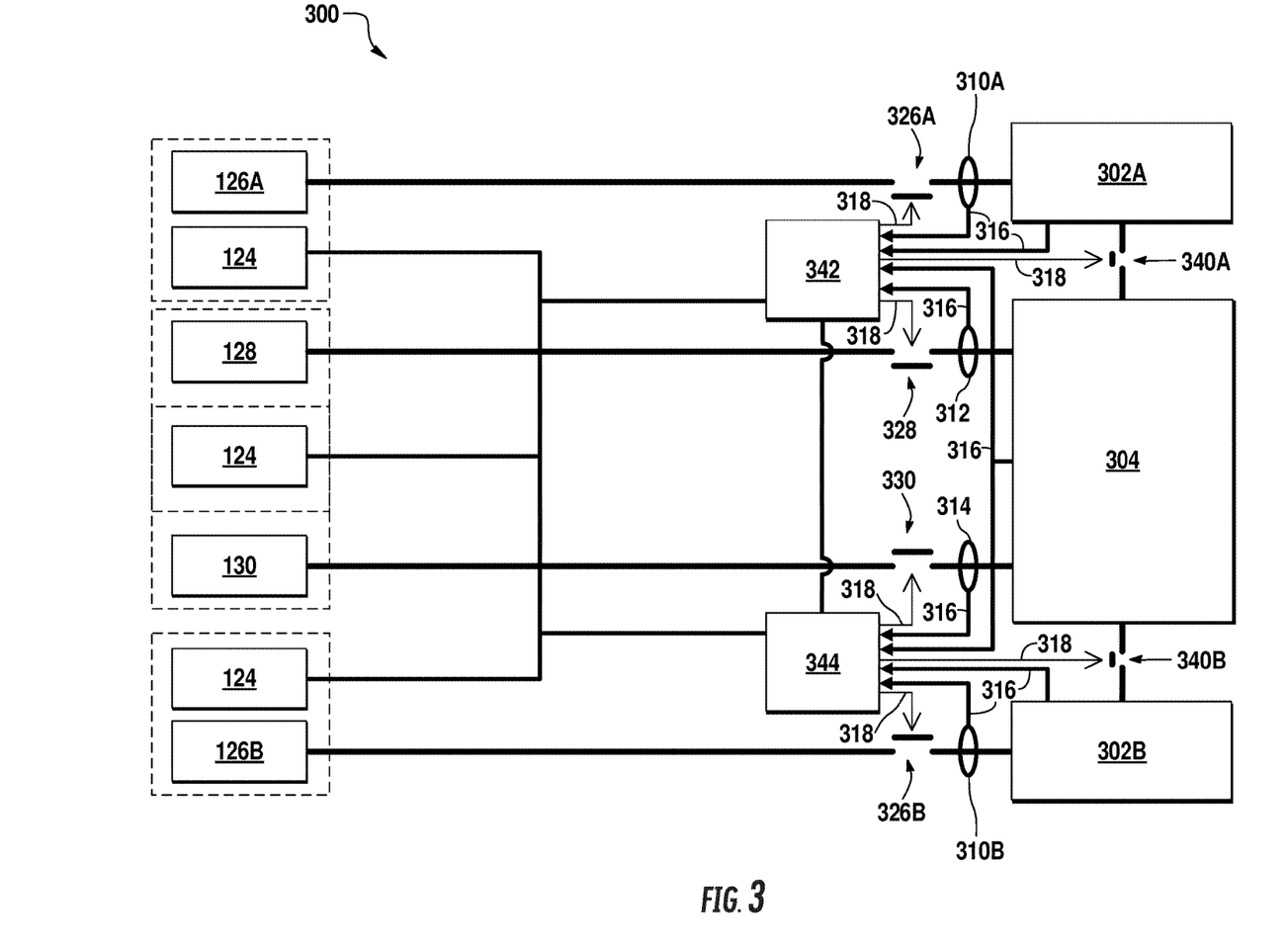
FIG. 3 depicts aspects of an example electrical power system according to example embodiments of the present disclosure.

FIG. 3 depicts aspects of an example electrical power system 300 according to example embodiments of the present disclosure. In some implementations, the electrical power system 300 can be a DC power system. For instance, the power sources 126A, 126B, 128, and 130 can be DC power sources and the electrical buses 302A, 302B, and 304 can be DC electrical buses.

As shown in FIG. 3, in some implementations, each power source 126A, 126B, 128, and 130 can be associated with one or more control device(s) 124. For example, the first power source 126A and the second power source 126B can each be associated with separate control device(s) 124. The third power source 128 and the fourth power source 130 can be associated with the same control device(s) 124. In other implementations, the third power source 128 and the fourth power source 130 can be associated with different, separate control device(s) 124.

In a similar manner to that described above with reference to FIG. 2, the control device(s) 124 of FIG. 3 can be configured to monitor and determine the state(s) of a plurality of electrical characteristics for each power source 126A, 126B, 128, and 130 and/or each electrical bus 302A, 302B, and 304. For instance, the control device(s) 124 can include and/or be configured to communicate with one or more power distribution communications manager(s) 342 and 344. The communications manager(s) 342 and 344 can be configured to communicate with one or more measurement device(s) 310A, 310B, 312, and 314 (e.g., current transformer assemblies) and/or other measurement device(s) configured to provide feedback signal(s) 316 indicative of the electrical characteristic measurements associated with the power sources 126A, 126B, 128, and 130 and/or the electrical buses 302A, 302B, and 304.

The control device(s) 124 of FIG. 3 can be configured to selectively control a power distribution of the plurality of power sources 126A, 126B, 128, and 130 among the plurality of electrical buses 302A, 302B, and 304 in a manner similar to that described above with reference to FIG. 2. For example, the control device(s) 124 can be configured to communicate with the communications manager(s) 342 and 344 to send one or more control signal(s) 318 to couple and/or de-couple the power sources 126A, 126B, 128, and 130 among the plurality of electrical buses 302A, 302B, and 304 via a plurality of contactor(s) 326A, 326B, 328, and 330. Moreover, control device(s) 124 can be configured to communicate with the communications manager(s) 342 and 344 to send one or more control signal(s) 318 to couple and/or decouple the electrical buses 302A and/or 302B from the third electrical bus 304 via the cross-tie contactors 340A and 340B.

Figure 4:
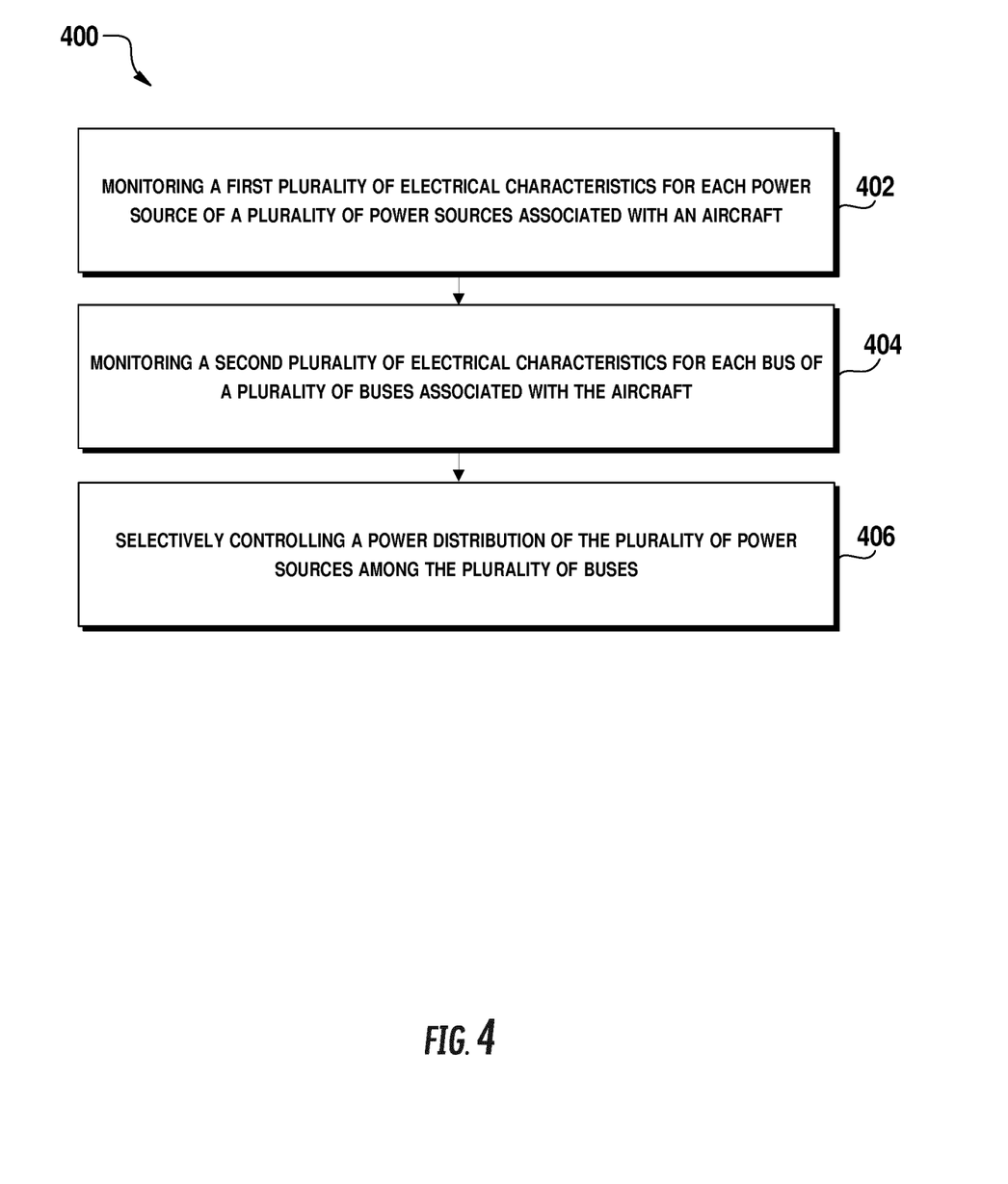
FIG. 4 depicts a method for controlling power distribution according to example embodiments of the present disclosure.

FIG. 4 depicts a method 400 for controlling power distribution in an aircraft 102 according to example embodiments of the present disclosure. FIG. 4 can be implemented by one or more control device(s), such as the control device(s) 124 depicted in FIGS. 2 and 3. While the step(s) of FIG. 4 are described with reference to the electrical power system 120, the method 400 can also be implemented in other electrical power systems, such as electrical power system 300 and can include AC or DC power systems. In implementations in which method 400 is performed with respect to the aircraft 102, one or more step(s) of the method 400 can be performed while the aircraft 102 is in-flight and/or grounded. In addition, FIG. 4 depicts steps performed in a particular order for purposes of illustration and discussion. Those of ordinary skill in the art, using the disclosures provided herein, will understand that the various steps of any of the methods disclosed herein can be modified, adapted, expanded, rearranged and/or omitted in various ways without deviating from the scope of the present disclosure.

At (402), the method 400 includes monitoring a first plurality of electrical characteristics for each power source of a plurality of power sources associated with an aircraft 102. For instance, the control device(s) 124 can monitor a first plurality of electrical characteristics (e.g., via the feedback signal(s) 216) for each of the first power source 126A (e.g., first generator), the second power source 126B (e.g., second generator), the third power source 128 (e.g., auxiliary power source), and/or the fourth power source 130 (e.g., external power source). The first plurality of electrical characteristics can include one or more of a voltage, frequency, power, and/or current associated with each of the power sources.

At (404), the method 400 can include monitoring a second plurality of electrical characteristics for each electrical bus of a plurality of electrical buses associated with the aircraft 102. For instance, the control device(s) 124 can monitor a second plurality of electrical characteristics (e.g., via the feedback signal(s) 218) for each of the first electrical bus 202A, the second electrical bus 202B, and/or the third electrical bus 204 (e.g., electrical tie bus). The second plurality of electrical characteristics can include one or more of a voltage, frequency, power, and/or current associated with each of the electrical buses.

At (406), the method 400 can include selectively controlling a power distribution of the plurality of power sources among the plurality of electrical buses. For instance, the control device(s) 124 can selectively control the power distribution of the plurality of power sources among the plurality of electrical buses based, at least in part, on the first and second pluralities of electrical characteristics. For example, the control device(s) 124 can selectively control the power distribution of the first power source 126A, the second power source 126B, the third power source 128, and/or the fourth power source 130 among the first electrical bus 202A, the second electrical bus 202B, and the third electrical bus 204 based, at least in part, on the on voltages, frequencies, powers, and/or currents associated with the power sources and/or electrical buses.

To selectively control the power distribution of the power sources, the control device(s) 124 can send one or more control signal(s) 220 to the contactors 226A, 226B, 228, and 230 to couple and/or de-couple the power sources from the electrical buses. In doing so, the control device(s) 124 can selectively control the power distribution of the first power source 126A, the second power source 126B, the third power source 128, and the fourth power source 130 among the first electrical bus 202A, the second electrical bus 202B, and the third electrical bus 204 such that the first power source 126A has priority over (e.g., be coupled first to, only power source to be coupled to) the first electrical bus 202A, the second power source 126B has priority over the second electrical bus 202B, and the third power source 128 has priority over the third electrical bus 204.

Additionally, and/or alternatively, the control device(s) 124 can selectively control the power distribution to prevent cross-linking of power sources to the third electrical bus 204 (e.g., electrical tie bus). For example, the control device(s) 124 can selectively control the cross-tie contactors 240A and 240B to prevent cross-linking of the first power source 126A and the second power source 126B to the third electrical bus 204. To do so, the control device(s) 124 can send one or more control signals 220 to change the position (e.g., open, close) of the cross-tie contactors 240A and 240B.

The control device(s) 124 can also, and/or alternatively, selectively control the power distribution of the plurality of power sources 126A, 126B, 128, and 130 among the plurality of electrical buses 202A, 202B, and 204 by implementing one or more step(s) described below with respect to FIG. 5.

Figure 5:
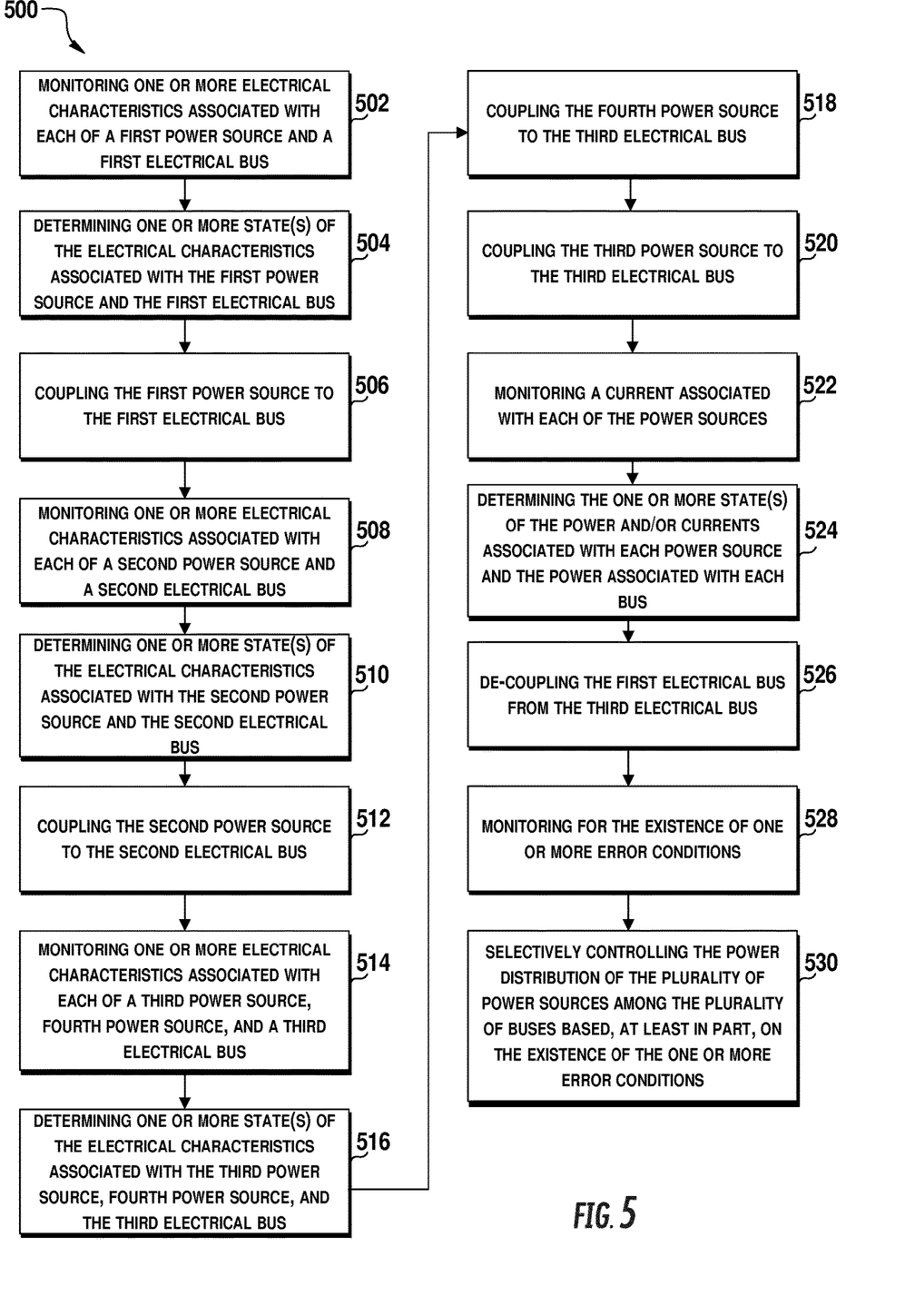
FIG. 5 depicts a method for controlling power distribution according to example embodiments of the present disclosure.

FIG. 5 depicts a method 500 for controlling power distribution according to example embodiments of the present disclosure. FIG. 5 can be implemented by one or more control device(s), such as the control device(s) 124 depicted in FIGS. 2 and 3. While the step(s) of FIG. 5 are described with reference to the electrical power system 120, the method 500 can also be implemented in other electrical power systems, such as the electrical power system 300 and can include AC or DC power systems. In implementations in which method 400 is performed with respect to the aircraft 102, one or more step(s) of the method 500 can be performed while the aircraft 102 is in-flight and/or grounded. In addition, FIG. 5 depicts steps performed in a particular order for purposes of illustration and discussion. Those of ordinary skill in the art, using the disclosures provided herein, will understand that the various steps of any of the methods disclosed herein can be modified, adapted, expanded, rearranged and/or omitted in various ways without deviating from the scope of the present disclosure.

At (502), the method 500 can include monitoring one or more electrical characteristics associated with each of a first power source and a first electrical bus. For instance, the control device(s) 124 can monitor a first voltage and a first frequency associated with the first power source 126A, and a first bus power and a first bus frequency associated with the first electrical bus 202A. As indicated above, the control device(s) 124 can monitor such electrical characteristics via the feedback signal(s) 216 and 218, which can be indicative of measurements associated with the first power source 126A and the first electrical bus 202A.

At (504), the method 500 can include determining one or more state(s) of the electrical characteristics associated with the first power source and the first electrical bus. The control device(s) 124 can determine a state of one or more of the electrical characteristics associated with the first power source 126A and the first electrical bus 202A based, at least in part, on the monitored electrical characteristics provided by the feedback signals 216 and 218. For instance, the control device(s) 124 can determine whether the first voltage associated with the first power source 126A is within a first voltage limit (e.g., associated with Mil Spec 704F/DO160 sect. 16). Additionally, and/or alternatively, the control device(s) 124 can determine whether the first frequency associated with the first power source 126A is within a first frequency limit (e.g., associated with Mil Spec 704F/DO160 sect. 16). The control device(s) 124 can determine whether, at least one of, the first frequency associated with the first power source 126A is synchronized with the first bus frequency associated with the first electrical bus 202A or whether the first bus power associated with the first electrical bus 202A is absent. In this way, the control device(s) 124 can avoid crash paralleling an out-of-sync generator.

At (506), the method 500 can include coupling the first power source to the first electrical bus. For instance, the control device(s) 124 can couple the first power source 126A to the first electrical bus 202A when it is determined: that the first voltage associated with the first power source 126A is within the first voltage limit and/or the first frequency is within the first frequency limit; and that the first frequency associated with the first power source 126A is synchronized with the first bus frequency associated with the first electrical bus 202A or the first bus power is absent. The control device(s) 124 can couple the first power source 126A to the first electrical bus 202A by sending one or more control signal(s) 220 to close the contactor 226A. Accordingly, the contactor 226A can close based, at least in part, on receiving the control signal(s) 220.

At (508), the method 500 can include monitoring one or more electrical characteristics associated with each of a second power source and a second electrical bus. For instance, the control device(s) 124 can monitor a second voltage and a second frequency associated with the second power source 126B, and a second bus power and a second bus frequency associated with the second electrical bus 202B. Again, the control device(s) 124 can monitor such electrical characteristics via the feedback signal(s) 216 and 218.

At (510), the method 500 can include determining one or more state(s) of the electrical characteristics associated with the second power source and the second electrical bus. The control device(s) 124 can determine a state of one or more of the electrical characteristics associated with the second power source 126B and the second electrical bus 202B based, at least in part, on the monitored electrical characteristics provided by the feedback signals 216 and 218. For instance, the control device(s) 124 can determine whether the second voltage associated with the second power source 126B is within a second voltage limit and/or whether the second frequency associated with the second power source 126B is within a second frequency limit. The control device(s) 124 can determine whether, at least one of, the second frequency associated with the second power source 126B is synchronized with the second bus frequency associated with the second electrical bus 202B or whether the second bus power associated with the second electrical bus 202B is absent.

At (512), the method 500 can include coupling the second power source to the second electrical bus. For instance, the control device(s) 124 can couple the second power source 126B to the second electrical bus 202A by sending one or more control signal(s) 220 to close the contactor 226B, which can in turn close. In some implementations, the control device(s) 124 can couple the second power source 126B to the second electrical bus 202B when it is determined: that the second voltage associated with the second power source 126B is within the second voltage limit and/or the second frequency is within the second frequency limit; and that the second frequency associated with the second power source 126B is synchronized with the second bus frequency associated with the second electrical bus 202B or the second bus power is absent.

At (514), the method 500 can include monitoring one or more electrical characteristics associated with each of a third power source, a fourth power source, and a third electrical bus. For example, the control device(s) 124 can monitor (e.g., via the feedback signals 216 and 218) a third power, a third voltage, and a third frequency associated with the third power source 128, a fourth voltage and a fourth frequency associated with the fourth power source 130, and a third bus power and a third bus frequency associated with the third electrical bus 204.

At (516), the method 500 can include determining one or more state(s) of the electrical characteristics associated with the third power source, the fourth power source, and the third electrical bus. For instance, the control device(s) 124 can determine whether the third voltage associated with the third power source 128 is within a third voltage limit and/or whether the third power associated with the third power source 128 is absent. Additionally, and/or alternatively, the control device(s) 124 can determine whether the third frequency associated with the third power source 128 is within a third frequency limit. The control device(s) 124 can also determine whether the fourth voltage and/or fourth frequency associated with the fourth power source 130 are within a fourth voltage limit and/or a fourth frequency limit, respectively.

The control device(s) 124 can also determine the synchronization of the frequency associated with the third electrical bus 204 and, at least one of, the third power source 128 or the fourth power source 130. For example, the control device(s) 124 can determine whether the third frequency associated with the third power source 128 is synchronized with the third bus frequency associated with the third electrical bus 204. The control device(s) 124 can determine whether the fourth frequency associated with the fourth power source 130 is synchronized with the third bus frequency associated with the third electrical bus 204. Additionally, and/or alternatively, the control device(s) 124 can determine whether the third bus power associated with the third electrical bus 204 is absent.

At (518), the method 500 can include coupling the third power source to the third electrical bus. For instance, the control device(s) 124 can couple the fourth power source 130 to the third electrical bus 204 when it is determined: that the third power associated with the third power source 128 is absent; that the fourth voltage and/or fourth frequency associated with the fourth power source 130 are within the fourth voltage limit and/or the fourth frequency limit, respectively; that the fourth frequency associated with the fourth power source 130 is synchronized with the third bus frequency associated with the third electrical bus 204 or the third bus power associated with the third electrical bus 204 is absent.

In addition to and/or in the alternative to the above, at (520), the method 500 can include coupling the fourth power source to the third electrical bus. For instance, the control device(s) 124 can couple the third power source 128 to the third electrical bus 204 when it is determined: that the third voltage and/or third frequency associated with the third power source 128 are within the third voltage limit and/or the third frequency limit, respectively; and that the third frequency associated with the third power source 128 is synchronized with the third bus frequency associated with the third electrical bus 204 or the third bus power associated with the third electrical bus 204 is absent.

In some implementations, the third power source 128 can have priority over the third electrical bus 204 (e.g., electrical tie bus). The control device(s) 124 can determine whether or not to couple the third power source 128 to the third electrical bus 204 before determining whether to couple the fourth power source 130. Moreover, in some implementations, the control device(s) 124 can selectively control the power distribution of the power sources such that the third power source 128 and the fourth power source 130 are not concurrently coupled to the third electrical bus 204.

At (522), the method 500 can include monitoring a current associated with each of the power sources. For instance, the control device(s) 124 can monitor a first current associated with the first power source 126A, a second current associated with the second power source 126B, a third current associated with the third power source 128, and a fourth current associated with the fourth power source 130. The control device(s) 124 can monitor the currents via one or more feedback signal(s) 216 provided to the control device(s) from the measurement device(s) 210A, 210B, 212, and 214.

At (524), the method 500 can include determining one or more state(s) of the power and/or current associated with each power source and the power associated with each electrical bus. For instance, the control device(s) 124 can determine whether the first bus power associated with the first electrical bus 202A is present or absent, whether the second power associated with the second electrical bus 202B is present or absent, and/or whether the third bus power associated with the third electrical bus 204 is present or absent. The control device(s) 124 can also determine whether the first current associated with the first power source 126A is present or absent, whether the second current associated with the second power source 126B is present or absent, whether the third current associated with the third power source 128 is present or absent, and/or whether the fourth current associated with the fourth power source 130 is present or absent.

At (526), the method 500 can include de-coupling the first electrical bus from the third electrical bus. For instance, the first electrical bus 202A can be coupled to the third electrical bus 204. However, the control device(s) 124 can de-couple the first electrical bus 202A from the third electrical bus 204 when: the first bus power associated with the first electrical bus 202A is present; when the third bus power associated with the third electrical bus 204 is present; when the first current is present; and when the second, third, or fourth current is present. The control device(s) 124 can de-couple the first electrical bus 202A from the third electrical bus 204 by sending one or more control signal(s) 220 to cross-tie contactor 240A to open. The cross-tie contactor 240A can open based, at least in part, on receiving such control signal(s) 220.

Additionally, and/or alternatively, at (526), the method 500 can include de-coupling the second electrical bus from the third electrical bus. For instance, the second electrical bus 202B can be coupled to the third electrical bus 204. However, the control device(s) 124 can de-couple the second electrical bus 202B from the third electrical bus 204 when: the second bus power associated with the second electrical bus 202B is present; the third bus power associated with the third electrical bus 204 is present; the second current associated with the second power source 202B is present; and the first current, third current, or fourth current is present. The control device(s) 124 can de-couple the second electrical bus 202B from the third electrical bus 204 by sending one or more control signal(s) 220 to cross-tie contactor 240B to open. The cross-tie contactor 240A can open based, at least in part, on receiving such control signal(s) 220. Accordingly, the control device(s) 124 can selectively couple and/or de-couple the first and second electrical buses 202A and 202B from the third electrical bus 204 to prevent cross-linking the first and second power sources 126A and 126B to the third electrical bus 204.

At (528), the method 500 can include monitoring for the existence of one or more error conditions. For instance, the control device(s) 124 can monitor for the existence of one or more error conditions within the electrical power system 120. At (528), the method 500 can include selectively controlling the power distribution of the plurality of power sources among the plurality of electrical buses based, at least in part, on the existence of the one or more error conditions. For instance, the control device(s) 124 can determine that one or more error conditions exists in the electrical power system 120, and then determine whether or not to couple a power source (e.g., 126A, 126B, 128, and 130) to the electrical buses 202A, 202B, and 204. By way of example, the control device(s) 124 can determine that an over voltage condition exists in the electrical power system 120. As such, the control device(s) 124 can determine not to couple one or more of the power sources 126A, 126B, 128, and 130 to the electrical buses 202A, 202B, and 204, even though at least some of the conditions discussed above are met.

The technology discussed herein makes computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

What we claim is:

1. A method for controlling power distribution, the method comprising:
   monitoring, by one or more control devices, a first plurality of electrical characteristics for each power source of a plurality of power sources,
      wherein the plurality of power sources comprises a first generator, a second generator, an auxiliary power source, and an external power source;
   monitoring, by the one or more control devices, a second plurality of electrical characteristics for each bus of a plurality of buses,
      wherein the plurality of buses comprises a first electrical bus, a second electrical bus, and an electrical tie bus; and
   selectively controlling, by the one or more control devices, a power distribution of the plurality of power sources among the plurality of buses based, at least in part, on the first and second pluralities of electrical characteristics, wherein the first plurality of electrical characteristics comprises a first voltage and a first frequency associated with the first generator, and the second plurality of electrical characteristics comprises a first bus power and a first bus frequency associated with the first electrical bus, and wherein selectively controlling, by the one or more control devices, the power distribution of the plurality of power sources among the plurality of buses comprises:
      determining, by the one or more control devices, whether the first voltage associated with the first generator is within a first voltage limit and whether the first frequency associated with the first generator is within a first frequency limit;
      determining, by the one or more control devices, whether at least one of the first frequency associated with the first generator is synchronized with the first bus frequency associated with the first electrical bus or the first bus power is absent; and
      coupling, by the one or more control devices, the first generator to the first electrical bus when the first voltage associated with the first generator is within the first voltage limit and the first frequency associated with the first generator is within the first frequency limit, and when the first frequency associated with the first generator is synchronized with the first bus frequency associated with the first electrical bus or the first bus power is absent.

2. The method of claim 1, wherein selectively controlling, by the one or more control devices, the power distribution of the plurality of power sources among the plurality of buses comprises:
   selectively controlling, by the one or more control devices, the power distribution of the first generator, the second generator, the auxiliary power source, and the external power source among the first electrical bus, the second electrical bus, and the electrical tie bus such that the first generator has priority over the first electrical bus, the second generator has priority over the second electrical bus, and the auxiliary power source has priority over the electrical tie bus.

3. The method of claim 1, wherein selectively controlling, by the one or more control devices, the power distribution of the plurality of power sources among the plurality of buses comprises:
   selectively controlling, by the one or more control devices, one or more cross-tie contactors to prevent cross-linking of the first generator and the second generator to the electrical tie bus.

4. The method of claim 1, wherein the first plurality of electrical characteristics comprises a second voltage and a second frequency associated with the second generator, and the second plurality of electrical characteristics comprises a second bus power and a second bus frequency associated with the second electrical bus, and wherein selectively controlling, by the one or more control devices, the power distribution of the plurality of power sources among the plurality of buses comprises:
   determining, by the one or more control devices, whether the second voltage associated with the second generator is within a second voltage limit and whether the second frequency associated with the second generator is within a second frequency limit;
   determining, by the one or more control devices, whether at least one of the second frequency associated with the second generator is synchronized with the second bus frequency associated with the second electrical bus or the second bus power is absent; and
   coupling, by the one or more control devices, the second generator to the second electrical bus when the second voltage associated with the second generator is within the second voltage limit and the second frequency associated with the second generator is within the second frequency limit, and when the second frequency associated with the second generator is synchronized with the second bus frequency associated with the second electrical bus or the second bus power is absent.

5. The method of claim 4, wherein the first plurality of electrical characteristics comprises a third power, a third voltage, and a third frequency associated with the auxiliary power source, a fourth voltage and a fourth frequency associated with the external power source, and the second plurality of electrical characteristics comprises a third bus power and a third bus frequency associated with the electrical tie bus, and wherein selectively controlling, by the one or more control devices, the power distribution of the plurality of power sources among the plurality of buses comprises:
   determining, by the one or more control devices, whether the third voltage associated with the auxiliary power source is within a third voltage limit or whether the third power is absent, whether the third frequency associated with the auxiliary power source is within a third frequency limit, whether the fourth voltage associated with the external power source is within a fourth voltage limit, and whether the fourth frequency associated with the external power source is within a fourth frequency limit;
   determining, by the one or more control devices, whether the third frequency associated with the auxiliary power source is synchronized with the third bus frequency associated with the electrical tie bus, whether the fourth frequency associated with the external power source is synchronized with the third bus frequency associated with the electrical tie bus, or whether the third bus power associated with the electrical tie bus is absent; and coupling, by the one or more control devices, the external power source to the electrical tie bus when the third power associated with the auxiliary power source is absent, and when the fourth voltage associated with the external power source is within the fourth voltage limit, and when the fourth frequency associated with the external power source is within the fourth frequency limit and is synchronized with the third bus frequency associated with the electrical tie bus or the third bus power associated with the electrical tie bus is absent.

6. The method of claim 5, wherein selectively controlling, by the one or more control devices, the power distribution of the plurality of power sources among the plurality of buses comprises:

coupling, by the one or more control devices, the auxiliary power source to the electrical tie bus when the third voltage associated with the auxiliary power source is within the third voltage limit, and when the third frequency associated with the auxiliary power source is within the third frequency limit and is synchronized with the third bus frequency associated with the electrical tie bus or the third bus power associated with the electrical tie bus is absent.

7. The method of claim 6, wherein the first electrical bus is coupled to the electrical tie bus, wherein the first plurality of electrical characteristics comprises a first current associated with the first generator, a second current associated with the second generator, a third current associated with the auxiliary power source, and a fourth current associated with the external power source, wherein selectively controlling, by the one or more control devices, the power distribution of the plurality of power sources among the plurality of buses comprises:
de-coupling, by the one or more control devices, the first electrical bus from the electrical tie bus when the first bus power is present, the third bus power is present, the first current is present, and the second, third, or fourth current is present.

8. The method of claim 6, wherein the second electrical bus is coupled to the electrical tie bus, wherein the first plurality of electrical characteristics comprises a first current associated with the first generator, a second current associated with the second generator, a third current associated with the auxiliary power source, and a fourth current associated with the external power source, wherein selectively controlling, by the one or more control devices, the power distribution of the plurality of power sources among the plurality of buses comprises:
de-coupling, by the one or more control devices, the second electrical bus from the electrical tie bus when the second bus power is present, the third bus power is present, the second current is present, and the first current, third current, or fourth current is present.

9. The method of claim 1, further comprising:
monitoring, by the one or more control devices, for the existence of one or more error conditions; and
wherein selectively controlling, by the one or more control devices, the power distribution of the plurality of power sources among the plurality of buses is based at least in part on the existence of the one or more error conditions.

10. An electrical power system, comprising:
a plurality of power sources;
a plurality of buses; and
a control system configured to
monitor a first plurality of electrical characteristics for each power source of the plurality of power sources,
monitor a second plurality of electrical characteristics for each bus of the plurality of buses,
selectively control a power distribution of the plurality of power sources among the plurality of buses based at least in part on the first plurality of electrical characteristics and the second plurality of electrical characteristics;
determine whether a first electrical characteristic of the plurality of electrical characteristics associated with a first power source of the plurality of power sources is within a first limit;
determine whether at least one of the first electrical characteristic associated with the first power source is synchronized with a second electrical characteristic of the second plurality of electrical characteristics associated with a first bus of the plurality of buses or a first bus power is absent; and
couple the first power source to the first bus when the first electrical characteristic is within the first limit.

11. The system of claim 10, wherein the plurality of power sources comprises a first generator, a second generator, an auxiliary power source, and an external power source, and wherein the plurality of buses comprises a first electrical bus, a second electrical bus, and an electrical tie bus.

12. The system of claim 11, wherein the control system is configured to selectively control the power distribution of the plurality of power sources among the plurality of buses such that the first generator has priority over the first electrical bus, the second generator has priority over the second electrical bus, and the auxiliary power source has priority over the electrical tie bus.

13. The system of claim 10, wherein the control system is configured to selectively control the power distribution of the plurality of power sources among the plurality of buses to prevent cross-linking of the first generator and the second generator to the electrical tie bus.

14. The system of claim 10, wherein the control system is configured to selectively control the power distribution of the plurality of power sources among the plurality of buses by selectively coupling and de-coupling a plurality of contactors associated with the plurality of buses.

15. The system of claim 10, wherein the current associated with each of the plurality of power sources and each of the plurality of buses is AC or DC.

16. A method for controlling power distribution, the method comprising:
monitoring, by one or more control devices, a first voltage and a first frequency associated with a first power source, and a first bus power and a first bus frequency associated with a first electrical bus;
determining, by the one or more control devices, whether the first voltage associated with the first power source is within a first voltage limit;
determining, by the one or more control devices, whether at least one of the first frequency associated with the first power source is synchronized with the first bus frequency associated with the first electrical bus or the first bus power associated with the first electrical bus is absent;

coupling, by the one or more control devices, the first power source to the first electrical bus when it is determined
   that the first voltage associated with the first power source is within the first voltage limit, and
   that the first frequency associated with the first power source is synchronized with the first bus frequency associated with the first electrical bus or the first bus power is absent;
monitoring, by the one or more control devices, a second voltage and a second frequency associated with a second power source, and a second bus power and a second bus frequency associated with a second electrical bus;
determining, by the one or more control devices, whether the second voltage associated with the second power source is within a second voltage limit;
determining, by the one or more control devices, whether at least one of the second frequency associated with the second power source is synchronized with the second bus frequency associated with the second electrical bus or the second bus power associated with the second electrical bus is absent; and
coupling, by the one or more control devices, the second power source to the second electrical bus when it is determined
   that the second voltage associated with the second power source is within the second voltage limit, and
   that the second frequency associated with the second power source is synchronized with the second bus frequency or the second bus power is absent.

17. The method of claim 16, further comprising:
monitoring, by the one or more control devices, a third power, a third voltage, and a third frequency associated with a third power source, a fourth voltage and a fourth frequency associated with a fourth power source, and a third bus power and a third bus frequency associated with a third electrical bus;
determining, by the one or more control devices, whether the third voltage associated with the third power source is within a third voltage limit or whether the third power is absent, and whether the fourth voltage associated with the fourth power source is within a fourth voltage limit;
determining, by the one or more control devices, whether the third frequency associated with the third power source is synchronized with the third bus frequency associated with the third electrical bus, whether the fourth frequency associated with the fourth power source is synchronized with the third bus frequency associated with the third electrical bus, or whether the third bus power associated with the third electrical bus is absent;
coupling, by the one or more control devices, the fourth power source to the third electrical bus when it is determined
   that the third power associated with the third power source is absent,
   that the fourth voltage associated the fourth power source is within the fourth voltage limit, and
   that the fourth frequency associated with the fourth power source is synchronized with the third bus frequency associated with the third electrical bus or the third bus power associated with the third electrical bus is absent; and
coupling, by the one or more control devices, the third power source to the third electrical bus when it is determined
   that the third voltage associated with the third power source is within the third voltage limit, and
   that the third frequency associated with the third power source is synchronized with the third bus frequency associated with the third electrical bus or the third bus power associated with the third electrical bus is absent.

18. The method of claim 17, wherein the first bus and the second bus are coupled to the third bus, the method further comprising:
monitoring, by the one or more control devices, a first current associated with the first power source, a second current associated with the second power source, a third current associated with the third power source, and a fourth current associated with the fourth power source;
determining, by the one or more control devices, whether the first bus power is present, and whether the third bus power is present;
determining, by the one or more control devices, whether the first current is present, whether the second current is present, whether the third current is present, or whether the fourth current is present;
de-coupling, by the one or more control devices, the first electrical bus from the third electrical bus when the first bus power is present, the third bus power is present, the first current is present, and the second, third, or fourth current is present; and
de-coupling, by the one or more control devices, the second electrical bus from the third electrical bus when the second bus power is present, the third bus power is present, the second current is present, and the first current, third current, or fourth current is present.

* * * * *